(No Model.) 4 Sheets—Sheet 1.
J. T. MEREDITH.
LIMEKILN.
No. 291,212. Patented Jan. 1, 1884.
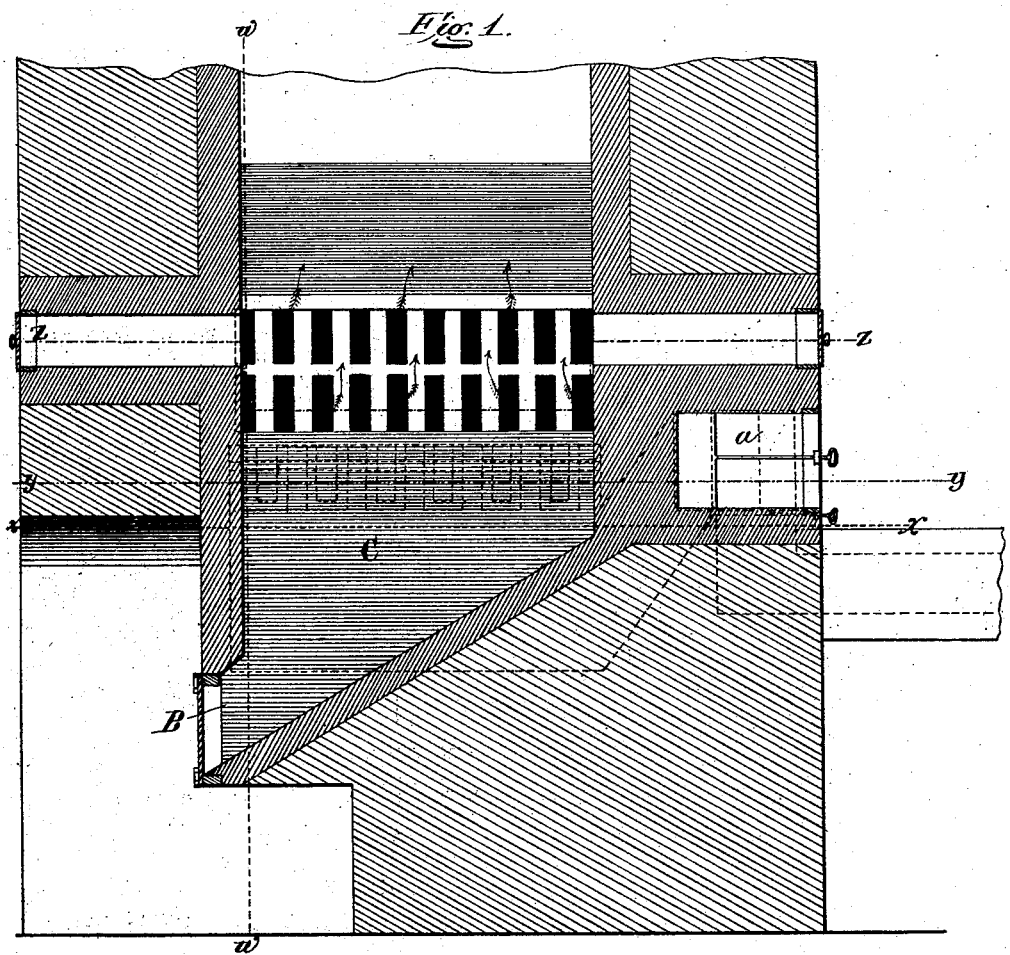
Witnesses:
E. J. Johnson
M. Kaumheimer
Inventor:
John T. Meredith
By Stout & Underwood
Attorneys.

(No Model.) 4 Sheets—Sheet 2.
J. T. MEREDITH.
LIMEKILN.
No. 291,212. Patented Jan. 1, 1884.
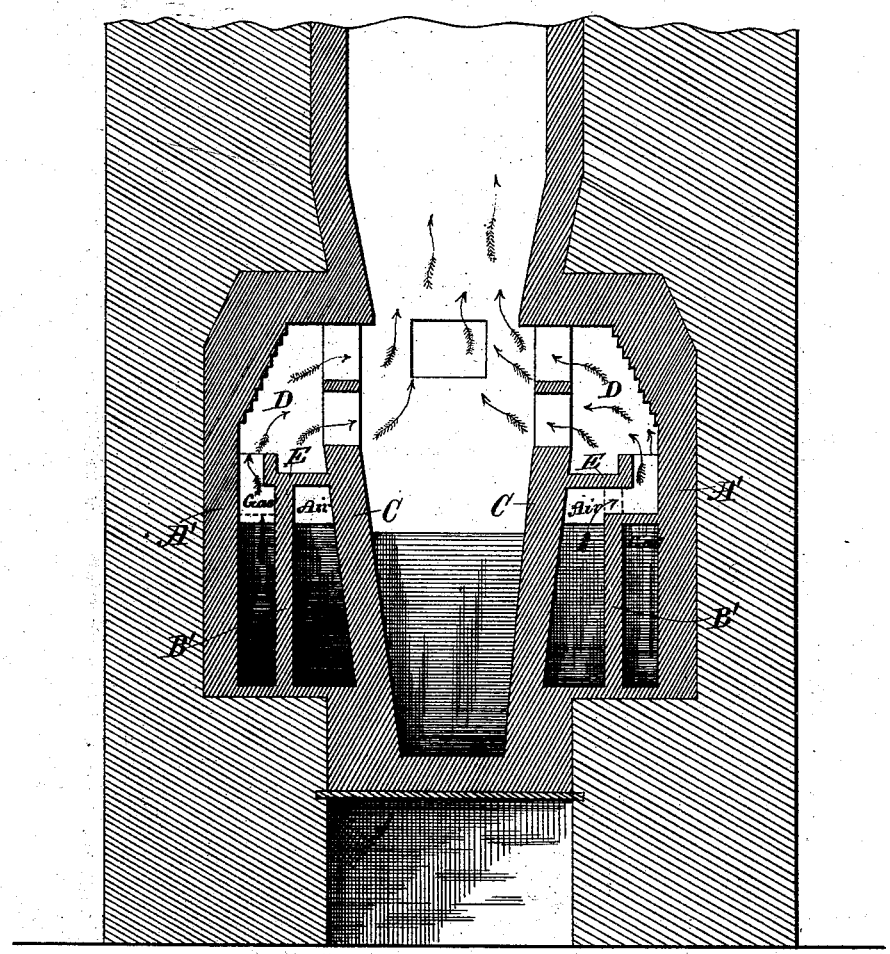

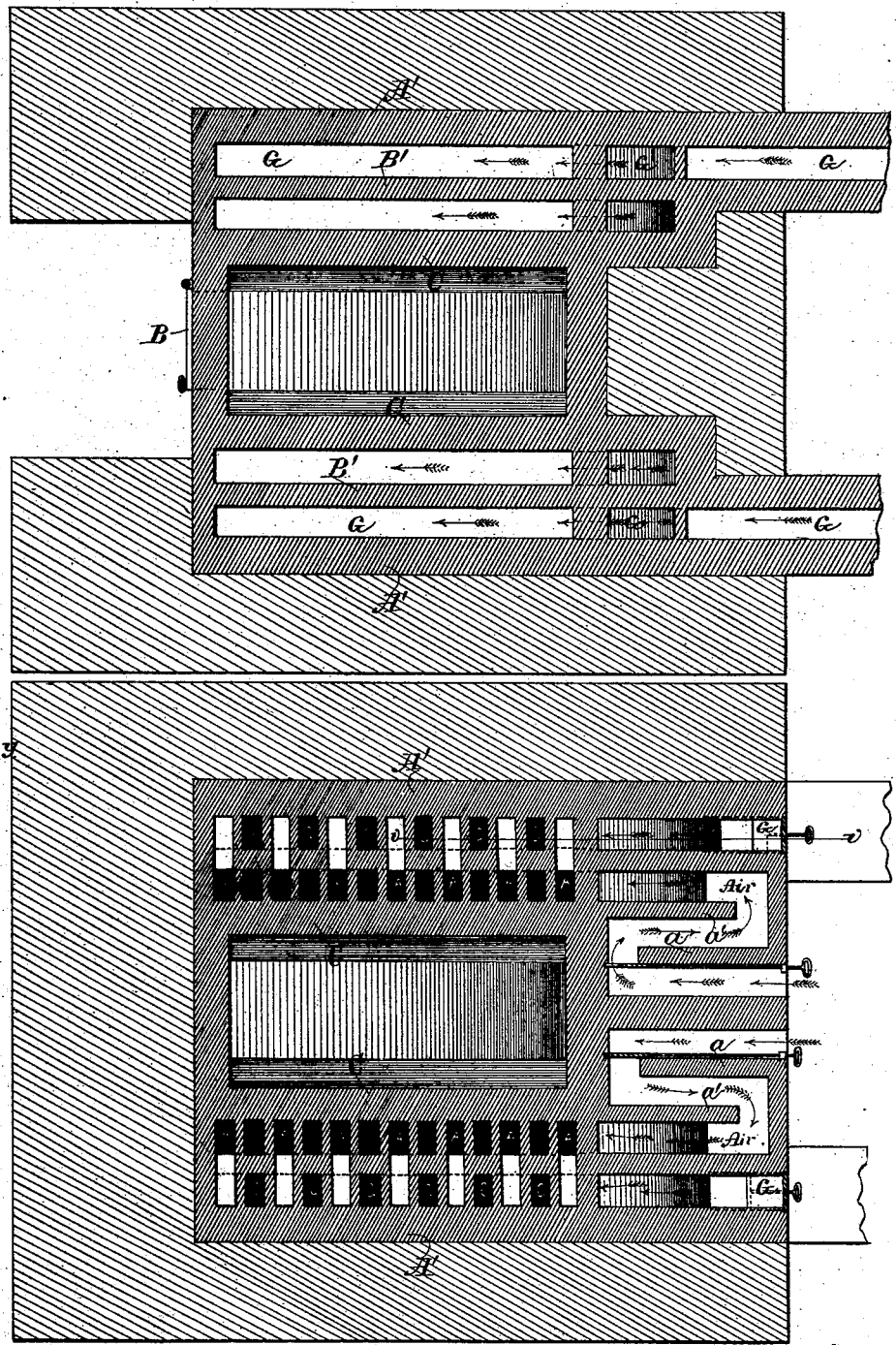

(No Model.) 4 Sheets—Sheet 4.

J. T. MEREDITH.
LIMEKILN.

No. 291,212. Patented Jan. 1, 1884.

Witnesses

Inventor
John T. Meredith
by Stout & Underwood
Attorneys

UNITED STATES PATENT OFFICE.

JOHN T. MEREDITH, OF MILWAUKEE, WISCONSIN.

LIMEKILN.

SPECIFICATION forming part of Letters Patent No. 291,212, dated January 1, 1884.

Application filed June 25, 1883. (No model.)

*To all whom it may concern:*

Be it known that I, JOHN T. MEREDITH, of Milwaukee, in the county of Milwaukee, and in the State of Wisconsin, have invented certain new and useful Improvements in Limekilns; and I do hereby declare that the following is a full, clear, and exact description thereof.

My invention relates to limekilns; and it consists in certain peculiarities of construction whereby gas may be used as fuel.

Figure 5:
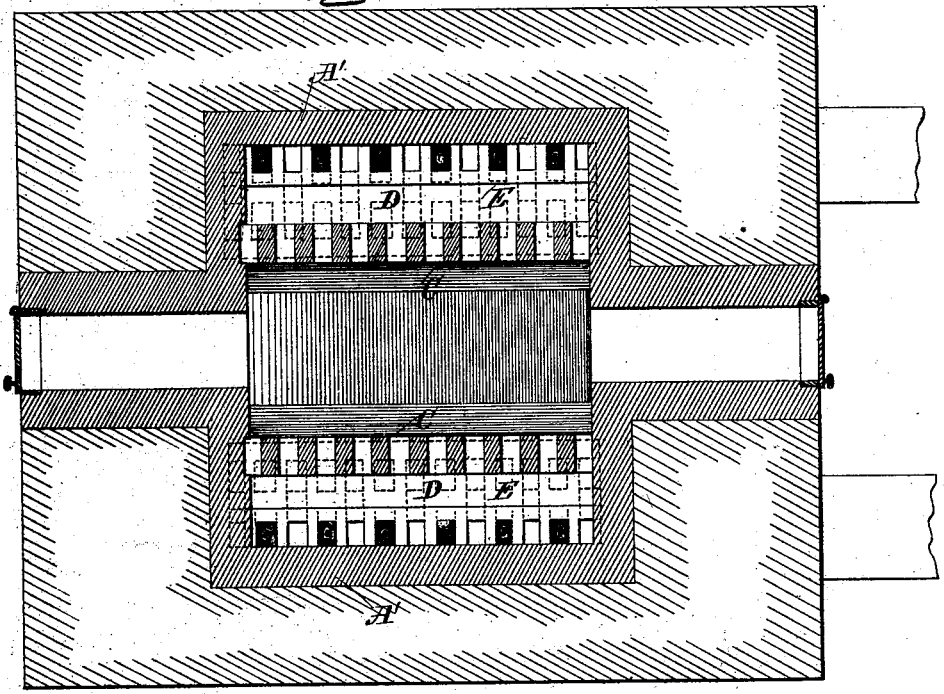
Figure 6:
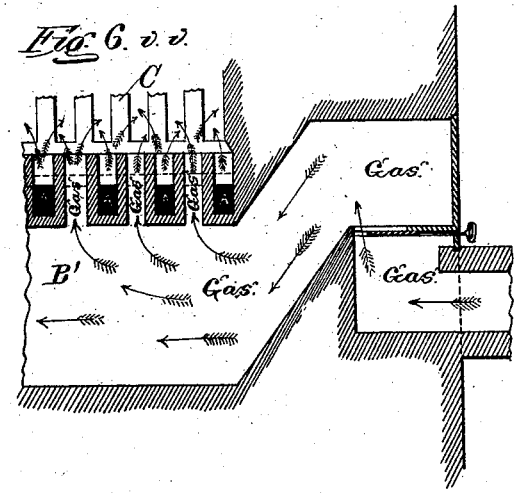

In the drawings, Figure 1 is a vertical central section of my improved kiln. Fig. 2 is a vertical cross-section of the same on line $w$ $w$, Fig. 1. Fig. 3 is a horizontal section on line $x$ $x$, Fig. 1. Fig. 4 is also a horizontal section, but on line $y$ $y$, Fig. 1. Fig. 5 is also a horizontal section on line $z$ $z$, Fig. 1; and Fig. 6 is a vertical section on line $v$ $v$, Fig. 4.

A' are the outer walls of the kiln, and B is the discharge-outlet for the lime.

C are the inner walls, and between the inner and outer walls I build partitions B' B', that separate the air-flues A from the gas-flues G. The air-flues pass through the rear of the kiln around partitions $a$ $a'$ on a horizontal line, and then extend to the front walls of the kiln, an air-flue being built in on each side of the well of the kiln, and from it short upright flues lead into short horizontal flues, which in turn lead into a mixing-chamber, D. Gas-flues G G are also built into the kiln on the outside of the air-flues, as shown in Fig. 1, and these also extend the entire length of the kiln, and are connected by short vertical flues with the mixing-chamber D, the gas and air flues alternating, and from the mixing-chamber short horizontal flues lead into the well, as shown in Fig. 2.

E is a fire-bed, which is formed on top of the air-flue in the mixing-chamber, and on this bed a fire is built by which to ignite the gas as it is enriched with air, and also to create a draft.

In practice a fire is built upon the fire-bed, and then the gas and air are admitted, when they travel through the kiln in separate flues until the mixing-chamber is reached. Here they are ignited, and the flame passes out into the limestone, first with a very gentle heat, but as the kiln begins to warm the combustion increases until a very high temperature is reached and the limestone is melted.

I propose to manufacture the gas used at any convenient point near the kiln, and to make it of coal, oil, or any other gas-producing materials, and to regulate the inflow of both the gas and air by suitable dampers.

Having thus described my invention, what I claim as new, and desire to secure by Letters Patent, is—

1. The combination, in a limekiln, of air and gas flues arranged in series, and alternating with each other, and leading into a mixing-chamber, substantially as set forth.

2. The combination, in a limekiln, of air and gas flues arranged in series, and a mixing-chamber containing a fire-bed, substantially as set forth.

In testimony that I claim the foregoing I have hereunto set my hand, on this 6th day of June, 1883, in the presence of two witnesses.

JOHN T. MEREDITH.

Witnesses:
 S. S. STOUT,
 M. KAMUHEIMER.